United States Patent
Manna et al.

(10) Patent No.: US 9,179,357 B2
(45) Date of Patent: Nov. 3, 2015

(54) SYSTEMS AND METHODS FOR BUFFER STATUS REPORTING IN WIRELESS COMMUNICATION SYSTEMS

(71) Applicants: Avijit Manna, Kolkata (IN); Saptarshi Chaudhuri, Bangalore (IN)

(72) Inventors: Avijit Manna, Kolkata (IN); Saptarshi Chaudhuri, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 73 days.

(21) Appl. No.: 14/258,579

(22) Filed: Apr. 22, 2014

(65) Prior Publication Data

US 2015/0257033 A1 Sep. 10, 2015

(30) Foreign Application Priority Data

Mar. 10, 2014 (IN) ............................ 1217/CHE/2014

(51) Int. Cl.
*H04W 28/02* (2009.01)
*H04W 72/04* (2009.01)

(52) U.S. Cl.
CPC ...... *H04W 28/0278* (2013.01); *H04W 28/0268* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 8,913,518 | B2 * | 12/2014 | Heo | H04W 52/54 370/252 |
| 9,019,818 | B2 * | 4/2015 | Wu | H04W 24/02 370/229 |
| 2003/0145097 | A1 | 7/2003 | Connor et al. | |
| 2007/0127373 | A1 | 6/2007 | Ho et al. | |
| 2008/0294793 | A1 | 11/2008 | Han et al. | |
| 2009/0119564 | A1 | 5/2009 | Sagfors et al. | |
| 2009/0215456 | A1 | 8/2009 | Chun et al. | |
| 2010/0074230 | A1 * | 3/2010 | Ishii | H04W 72/1252 370/336 |
| 2010/0165936 | A1 | 7/2010 | Ray et al. | |
| 2011/0299476 | A1 * | 12/2011 | Fischer | G08C 17/02 370/328 |

(Continued)

FOREIGN PATENT DOCUMENTS

WO    WO 03/090419    10/2003

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8)," TS 23.401 V8.10.0 (Jun. 2010) (242 pages).

(Continued)

*Primary Examiner* — Hong Cho
(74) *Attorney, Agent, or Firm* — Finnegan, Henderson, Farabow, Garrett & Dunner, LLP (57) ABSTRACT

A method and system for efficient buffer status reporting at a base station is provided. The method may include identifying a transmission opportunity associated with a first protocol layer of the base station, where the transmission opportunity indicates a transmission capacity of the base station. The method may further include determining, via one or more hardware processors, a time interval for sending a buffer status report from a second protocol layer of the base station to the first protocol layer based on at least the transmission opportunity. The method may further include determining, via the one or more hardware processors, an expected buffer occupancy based on at least the time interval and a packet incoming rate associated with downlink packets, and sending the buffer status report from the second protocol layer to the first protocol layer based on at least the time interval.

21 Claims, 7 Drawing Sheets

(56) References Cited

U.S. PATENT DOCUMENTS

2013/0272123 A1* 10/2013 Lee .................. H04W 28/0268
370/230
2015/0071260 A1* 3/2015 Chun .................. H04L 1/1848
370/336

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)," TS 36.321 V8.0.0 (Dec. 2007) (23 pages).

"3rd Generation Partnership Project; Technical Specification Group Radio Access Network; Evolved Universal Terrestrial Radio Access (E-UTRA) Radio Resource Control (RRC); Protocol specification (Release 8)," TS 36.331 V8.0.0 (Dec. 2007) (56 pages).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," TS 36.300 V9.0.0 (Jun. 2009) (157 pages).

"3rd Generation Partnership Project; Technical Specification Group Radio Access Network; Evolved Universal Terrestrial Radio Access (E-UTRA); Radio Link Control (RLC) protocol specification (Release 11)," TS 36.322 V11.0.0 (Sep. 2012) (39 pages).

* cited by examiner

SYSTEMS AND METHODS FOR BUFFER STATUS REPORTING IN WIRELESS COMMUNICATION SYSTEMS

PRIORITY CLAIM

This U.S. patent application claims priority under 35 U.S.C. §119 to Indian Patent Application No. 1217/CHE/2014, filed Mar. 10, 2014, and entitled "SYSTEMS AND METHODS FOR BUFFER STATUS REPORTING IN WIRELESS COMMUNICATION SYSTEMS." The aforementioned application is incorporated herein by reference in its entirety.

TECHNICAL FIELD

This disclosure relates generally to wireless communication systems and, more particularly, to systems and methods for buffer status reporting in wireless communication systems.

BACKGROUND

Rapid increase in the mobile subscriber base and recent emergence of new applications such as multimedia online gaming, mobile TV, streaming multimedia content, etc. have resulted in large scale increases of mobile data usage. The rapid increase of mobile data usage has motivated development of new protocols and modification of the current protocols in the wireless access and core portions of wireless networks to support efficient end-to-end packet transmission. An example of a wireless broadband network is 3rd Generation Partnership Project (3GPP) Long-Term Evolution (LTE). LTE is an end-to-end broadband internet protocol (IP) network that aims to provide high sector capacity, scalability, improved end-user throughputs, and reduced user plane latency, bringing a significantly improved user experience with full mobility.

As the number of users and applications in wireless networks increase, the number of internal control messages exchanged within a network entity, such as a base station, can be high. The increased number of internal control messages may cause processing delays in the network entity and, as a result, degrade the quality of service (QoS). Accordingly, it is desirable to reduce the number of internal control messages exchanged within a network entity, reduce the processing delays, and in the meantime maintain network throughput and the level of QoS provided to the users.

SUMMARY

According to an exemplary embodiment, a method for efficient buffer status reporting at a base station is provided. The method may include identifying a transmission opportunity associated with a first protocol layer of the base station, the transmission opportunity indicating a transmission capacity of the base station; determining, via one or more hardware processors, a time interval for sending a buffer status report from a second protocol layer of the base station to the first protocol layer based on at least the transmission opportunity; determining, via the one or more hardware processors, an expected buffer occupancy based on at least the time interval and a packet incoming rate associated with downlink packets; and sending the buffer status report from the second protocol layer to the first protocol layer based on at least the time interval. The buffer status report may indicate a buffer size associated with the expected buffer occupancy of the downlink packets to be transmitted by the first protocol layer. The method may further include determining a current buffer occupancy based on at least a packet size of incoming downlink packets. The current buffer occupancy may be increased by the packet size of the incoming downlink packets based on receiving the incoming downlink packets. Determining the time interval may include determining an average transmission opportunity associated with the first layer, and determining an average time interval between status indication messages sent from the first protocol layer to the second protocol layer. The time interval may be proportional to the current buffer occupancy and the average time interval between the status indication messages, and inversely proportional to the average transmission opportunity. The method may further include receiving one or more parameters from an application of the base station. The one or more parameters may be used by the base station to determine at least one of the average transmission opportunity, the average time interval between the status indication messages, or the packet incoming rate. The packet incoming rate may be determined by calculating an average number of packets received on a logical channel of a user equipment over a certain time period. The first protocol layer may be a medium access control (MAC) layer and the second protocol layer may be a radio link control (RLC) layer.

According to another exemplary embodiment, a system for efficient buffer status reporting at a base station is provided. The system may include one or more hardware processors and a memory storing instructions that, when executed by the one or more hardware processors, may cause the one or more hardware processors to perform operations including: identifying a transmission opportunity associated with a first protocol layer of the base station, the transmission opportunity indicating a transmission capacity of the base station; determining a time interval for sending a buffer status report from a second protocol layer of the base station to the first protocol layer based on at least the transmission opportunity; determining an expected buffer occupancy based on at least the time interval and a packet incoming rate associated with downlink packets; and sending the buffer status report from the second protocol layer to the first protocol layer based on at least the time interval.

According to another exemplary embodiment, a non-transitory computer-readable medium storing instructions for efficient buffer status reporting at a base station is provided. The non-transitory computer-readable medium, when executed by a processor, may cause the processor to perform operations including: identifying a transmission opportunity associated with a first protocol layer of the base station, the transmission opportunity indicating a transmission capacity of the base station; determining a time interval for sending a buffer status report from a second protocol layer of the base station to the first protocol layer based on at least the transmission opportunity; determining an expected buffer occupancy based on at least the time interval and a packet incoming rate associated with downlink packets; and sending the buffer status report from the second protocol layer to the first protocol layer based on at least the time interval.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It is intended that the following detailed description be considered as exemplary only, with the true scope and spirit being indicated by the following claims.

The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 1:
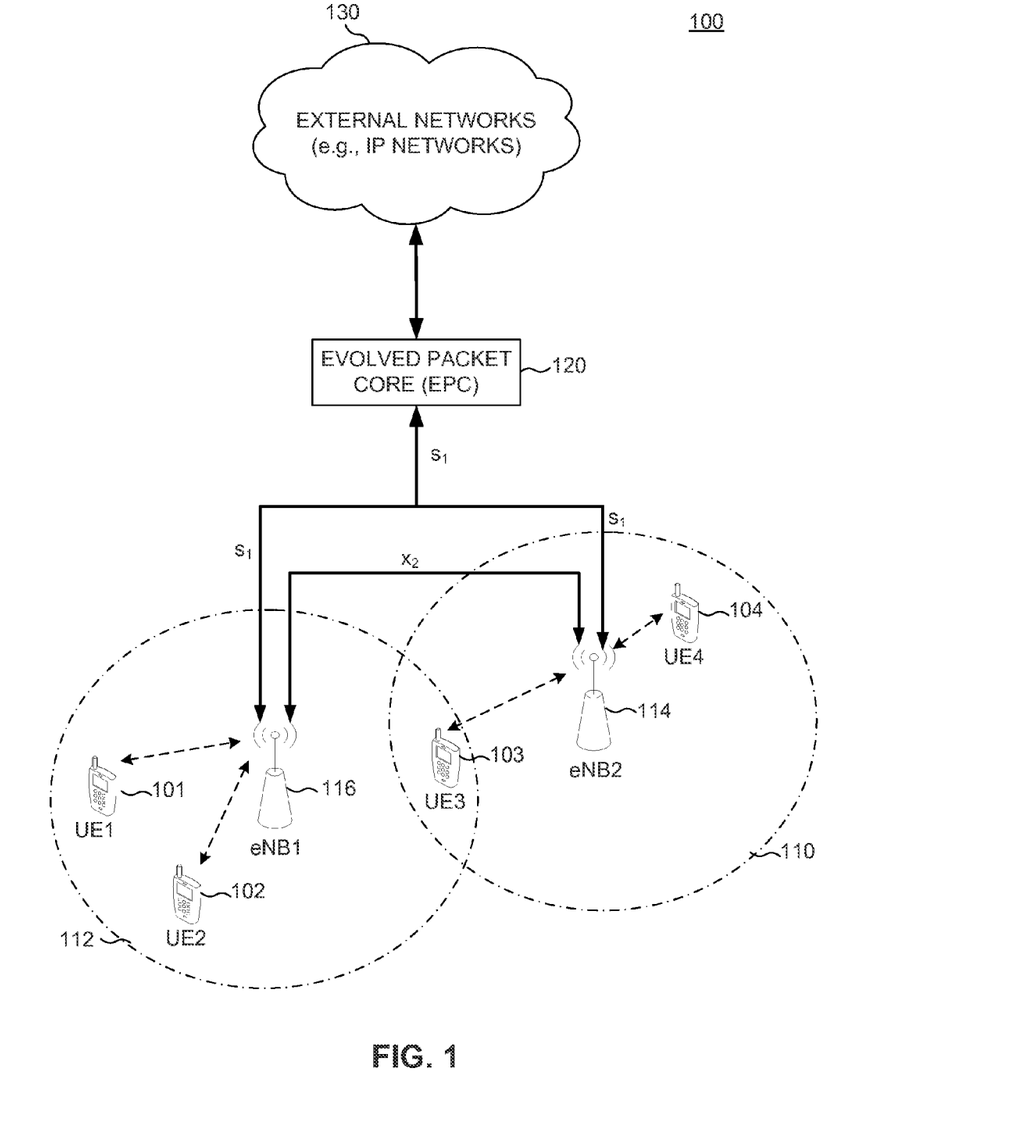
FIG. 1 illustrates an exemplary cellular wireless communication system for implementing methods and systems consistent with the present disclosure.

FIG. 1 illustrates an exemplary cellular Long-Term Evolution (LTE) wireless communication system 100 for implementing methods and systems consistent with the present disclosure. The LTE system 100 shown in FIG. 1 includes one or more base stations (e.g., 114 and 116). In the example of FIG. 1, the base stations are shown as evolved NodeBs (eNBs) 114 and 116. Base stations are nodes that can relay signals for mobile devices, also referred to herein a user equipment (UE). The term "base station" (BS) can be interchangeably used with a network node, an access node, or a network component. Two or more base stations may operate on the same radio frequency or on different radio frequencies depending on the separation between the two or more base stations.

The example LTE system 100 of FIG. 1 includes one or more radio access networks (110, 112), core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown, one or more mobile electronic devices 101-104 may operate within the LTE system 100. In some implementations, 2G/3G systems, Global System for Mobile communication (GSM), Interim Standard 95 (IS-95), Universal Mobile Telecommunications System (UMTS) and/or Code Division Multiple Access (CDMA2000) may also be integrated into the LTE wireless communication system 100.

The example LTE system shown in FIG. 1 includes eNB 114 and eNB 116. Cell 110 may be the service area of eNB 114 and Cell 112 may be the service area of eNB 116. Cell 110 and Cell 112 may overlap. User equipment (UEs) 101 and 102 may operate in Cell 112 and be served by eNB 116. The LTE system 100 can include one or more eNBs (e.g., eNB 114 and eNB 116), and one or more UEs (e.g., UE 101 and UE 102) can operate in a cell. The eNB 114 or 116 may include a processing module. The processing module may include one or more processing components (alternatively referred to as "processors" or "central processing units" (CPUs)) operable to execute instructions related to one or more of the processes, steps, or actions described in connection with one or more of the embodiments disclosed herein. The processing module may include other auxiliary components, such as random access memory (RAM), read only memory (ROM), secondary storage (for example, a hard disk drive or flash memory). Additionally, the processing module may execute certain instructions and commands to provide wireless or wired communication, using a wired communication subsystem or a wireless communication subsystem of the eNB.

The UEs 101-104 may be any wireless electronic device used by an end-user to communicate, for example, within the LTE system 100. The UEs 101-104 may transmit voice, video, multimedia, text, web content and/or any other user/client-specific content. The transmission of some contents, e.g., video and web content, may require high channel throughput to satisfy the end-user demand. The UEs 101-104 may generate requests, send responses or otherwise communicate in different means with Evolved Packet Core (EPC) 120 and/or Internet Protocol (IP) networks 130 through one or more eNBs 114 and 116. Examples of UE include, but are not limited to, a mobile phone, a smart phone, a telephone, a television, a remote controller, a set-top box, a computer monitor, a computer (including a tablet computer, a desktop computer, a handheld or laptop computer, a netbook computer), a personal digital assistant (PDA), etc.

A radio access network is part of a mobile telecommunication system that implements a radio access technology, such as Universal Mobile Telecommunications System (UMTS), CDMA2000, and 3rd Generation Partnership Project (3GPP) LTE. In many applications, the Radio Access Network (RAN) included in an LTE telecommunications system 100 is called a EUTRAN. The EUTRAN can be located between the UEs and EPC. The EUTRAN includes at least one eNB 114 or 116. The eNB can be a radio base station that may control all, or at least some, radio related functions in a fixed part of the system. One or more of eNB 114 or 116 can provide radio interface within their coverage area or a cell for the UEs 101-104 to communicate. The eNBs 114 and 116 may be distributed throughout the cellular network to provide a wide area of coverage. The backhaul link between the eNBs 114 and 116 is referred to as an X2 interface. The eNBs 114 and 116 directly communicate with one or more UEs 101-104, other eNBs, and the EPC 120.

The eNBs 114 and 116 may be the end point of the radio protocols towards the UEs 101-104 and may relay signals between the radio connection and the connectivity towards the EPC 120. The backhaul link between the eNB and the core network is referred to as an S1 interface. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN mobility and mobility with other legacy 2G/3G systems. The SGW functions may include the user plane tunnel management and switching. The PGW may provide connectivity to the services domain comprising external networks 130, such as the IP networks.

Though described in terms of FIG. 1, the present disclosure is not limited to such an environment. In general, cellular wireless communication systems may be described as cellular networks made up of a number of radio cells, or cells that are each served by a base station or other fixed transceiver. The cells may be used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
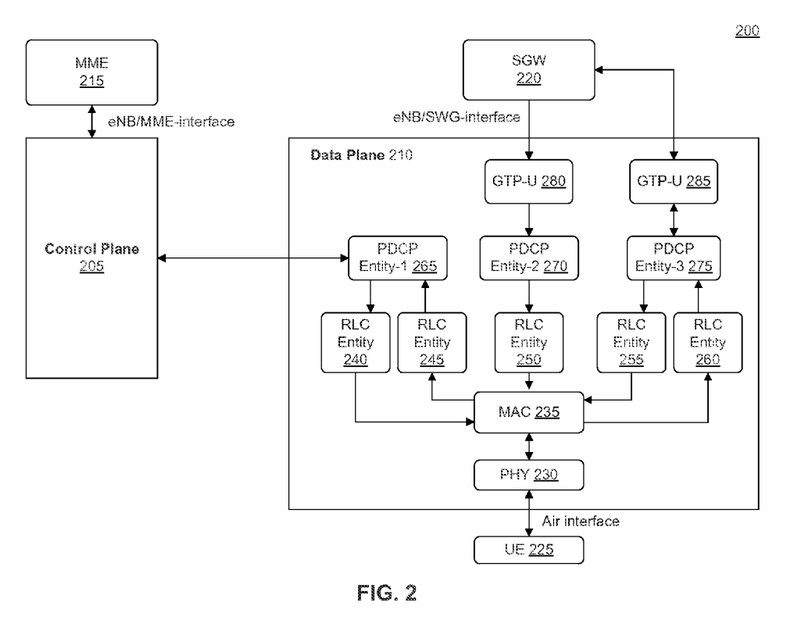
FIG. 2 illustrates an exemplary protocol architecture of a base station for implementing methods and systems consistent with the present disclosure.

FIG. 2 illustrates an exemplary protocol architecture of a base station 200 for implementing methods and systems consistent with the present disclosure. Functionalities of a base station can be generally split into two primary categories: data plane functions and control plane functions. As a result of the functionality split, the protocol architecture of a base station may include a control plane 205 and a data plane 210. The control plane 205 may interact with MME 215 for managing information flow and signaling between the radio access network and the core network. The data plane 210 may interact with SGW 220 and UE 225 to carry user data.

As illustrated in FIG. 2, data plane 210 may comprise a Physical (PHY) layer 230, a Medium Access Control (MAC) layer 235, a Radio Link Control (RLC) layer including one or more RLC entities (e.g., 240-260), a Packet Data Convergence Protocol (PDCP) layer including one or more PDCP entities (e.g., 265-275), and one or more GPRS Tunneling Protocol for User Plane (GTP-U) (e.g., 280 and 285). The user data packets exchanged between SGW and UE travel through each of the protocol layers GTP-U, PDCP, RLC, MAC and PHY layer within the eNB sub-system. Similarly, user control packets exchanged between MME and UE travel through Radio Resource Control (RRC), PDCP, RLC, MAC and PHY layer.

The user packets may be transmitted over Ethernet channels between MME/SGW and eNB, and/or over air interface through Radio Bearers (RBs) by eNB. Each RB data is transmitted on a specific Logical Channel (LCH) per UE. Each Radio Bearer (RB) may be associated with one PDCP entity, which in turn may be associated with one or more RLC entities (one for each direction) depending on RB characteristics (e.g., uni-directional or bi-directional).

The Downlink (DL) user packets may be transmitted from the MME/SGW to UE via eNB. Downlink packets may flow through the protocol layers (PDCP, RLC and MAC) within the eNB. For example, the downlink packets may be received at the RLC layer from the SGW through GTP-U and PDCP, and these packets may be maintained in buffers at the RLC layer. Then, the RLC layer may inform the MAC layer of its transmission buffer size by sending an Internal Control Message (ICM), such as MAC Status Request. The MAC layer may then provide the RLC layer with its current available capacity information by sending transmission opportunity message (e.g., MAC Status Indication) at each Transmission Time Interval (TTI). The RLC layer may then compile (concatenation and/or segmentation along with header addition) packets from one or more buffers (queues) based on the transmission opportunity information. The RLC layer may also send the compiled message to the MAC layer, for example, as MAC Data Request. The MAC layer may further process the packets and deliver them to physical layer for air transmission. The reverse process may occur for uplink packets at eNB sub-system.

Figure 3:
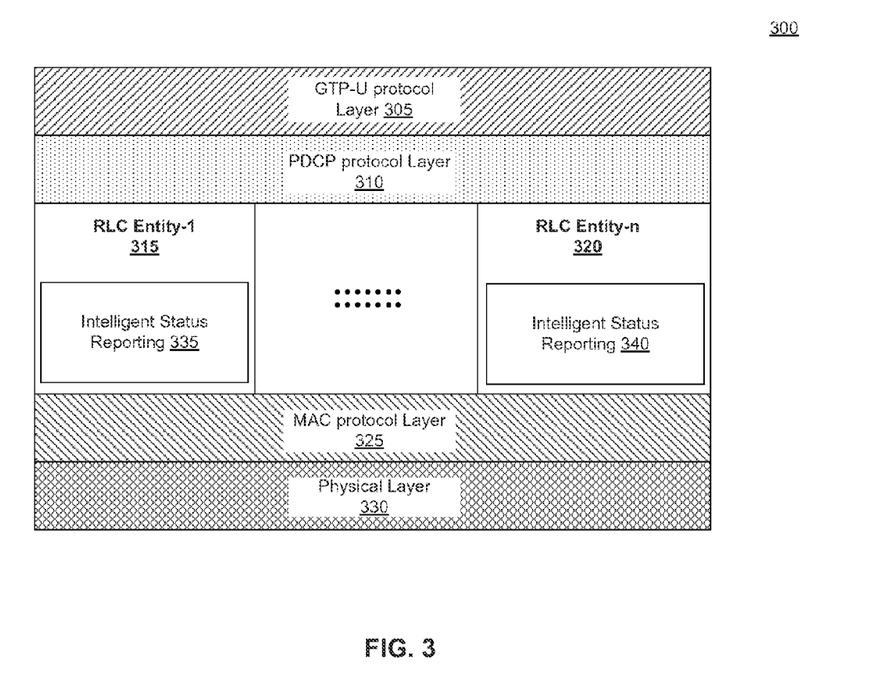
FIG. 3 illustrates an exemplary protocol layer implementation, in accordance with an embodiment of the present disclosure.

FIG. 3 illustrates an exemplary protocol layer implementation 300 of a base station, according to some embodiments of the present disclosure. As shown in FIG. 3, the base station may include a GTP-U protocol layer 305, a PDCP protocol layer 310, an RLC Layer including one or more RLC entities (e.g., 315 and 320), a MAC protocol layer 325, and a physical layer 330. The RLC entities 315 and 320 may each include an Intelligent Status Reporting (ISR) module 335 and 340, respectively. The Intelligent Status Reporting module may serve to maintain efficient buffer status reporting to the MAC protocol layer 325. In contrast to a conventional RLC entity, which sends a buffer status report to the MAC protocol layer whenever a new downlink packet is received, the ISR module may enable the RLC entity to send buffer status reports at certain time interval and also take into account the expected incoming buffer occupancy in the buffer status report sent to the MAC protocol layer. The time interval may be calculated by the RLC entity based upon the average of the time interval between two transmission opportunities by the MAC layer. The MAC protocol layer may calculate independently, by using its internal logic, the time interval between two transmission opportunities. This series of the calculated time intervals between two transmission opportunities may be observed by the RLC entity, and based upon the average of these series of time intervals, the RLC entity may calculate an intelligent status request time interval at which buffer status report may be sent to the MAC protocol layer. The capabilities of the ISR module include, for example, receiving initial buffer parameters from a management application, calculating packet incoming rate, calculating current buffer occupancy and expected buffer occupancy, determining an intelligent status request time interval (ISRTI) for sending buffer status reports to the MAC layer, etc. The detailed description with respect to the ISR module will be provided below in connection with FIGS. 4-7.

Figure 4:
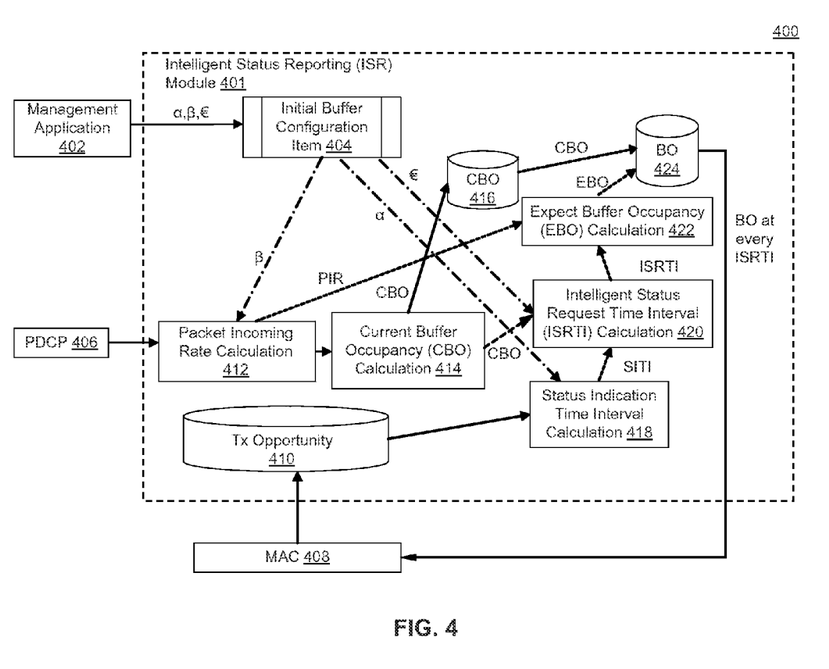
FIG. 4 illustrates an exemplary functional block diagram of an intelligent status reporting (ISR) module, according to some embodiments of the present disclosure.

FIG. 4 illustrates an exemplary functional block diagram 400 of an intelligent status reporting (ISR) module, according to some embodiments of the present disclosure. As shown in FIG. 4, the ISR module 401 may interact with management application 402, PDCP protocol layer 406, and MAC protocol layer 408. The ISR module 401 may include an Initial Buffer Configuration Item 404, a Packet Incoming Rate Calculation module 412, a Current Buffer Occupancy (CBO) Calculation module 414, a Status Indication Time Interval Calculation module 418, an Intelligent Status Reporting Time Interval (ISRTI) Calculation module 420, and/or an Expected Buffer Occupancy (EBO) Calculation module 422. Additionally, the ISR module 401 may include a transmission (Tx) Opportunity data storage 410, a CBO data storage 416, and/or a Buffer Occupancy (BO) data storage 424.

As shown in FIG. 4, the Initial Buffer Configuration Item 404 may receive initial buffer configuration parameters from the Management Application 402. The received initial buffer configuration parameters may include, for example, Status Indication Time Interval Constant α, Incoming Packet Size Constant β, and Transmission Opportunity Constant ε. The Initial Buffer Configuration Item 404 may pass the Incoming Packet Size Constant β, Status Indication Time Interval Constant α, and Transmission Opportunity Constant ε, to the Packet Incoming Rate Calculation module 412, Status Indication Time Interval Calculation module 418, and Intelligent Status Request Time Interval Calculation module 420, respectively.

The Packet Incoming Rate Calculation module 412 may calculate the Packet Incoming Rate (PIR) for each of the UE's each Logical Channel (LCH) based on the average number of packets received over a time interval from PDCP protocol layer 406. The CBO Calculation module 414 may calculate current buffer occupancy when a new packet associated with a LCH of a UE is received from a corresponding PDCP entity.

The Status Indication Time Interval Calculation module 418 may calculate the Status Indication Time Interval (SITI), which is the average time interval between two MAC Status Indication messages providing transmission opportunity associated with a LCH of a UE. The ISRTI Calculation module 420 may calculate the intelligent status reporting time interval (ISRTI) based on the CBO and SITI. The Expected Buffer Occupancy (EBO) Calculation module 422 may calculate the Expected Buffer Occupancy (EBO) based on the calculated PIR and ISRTI.

The Buffer Occupancy (BO) data storage 424 may combine the CBO and EBO, and may send the combined BO value to the MAC protocol layer 408 at every ISRTI in a buffer status report message. The buffer status report message may be an internal control message within the base station, such as a MAC Status Request message. By sending the buffer status report at every ISRTI, the number of internal control messages at the base station can be effectively reduced, because the buffer status report is not necessarily triggered every time a new packet is received in a UE's logical channel. The buffer status report may be triggered at the expiry of the ISRTI. If the ISRTI has not expired, the RLC entity may wait for more incoming data packets before sending a buffer status report to the MAC protocol layer.

Figure 5:
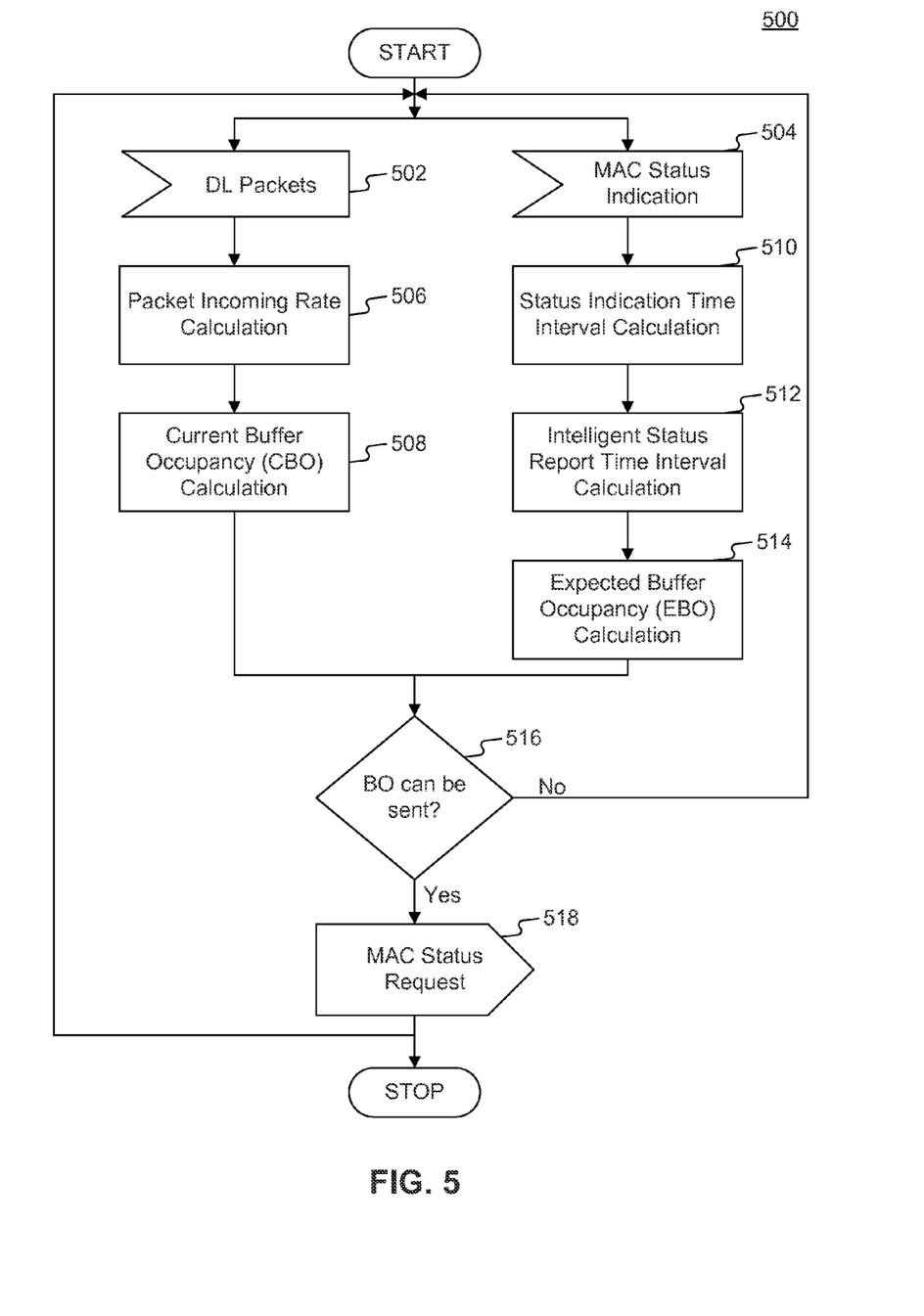
FIG. 5 is a flowchart of an exemplary method for buffer status reporting at a base station, consistent with some embodiments of the present disclosure.

FIG. 5 is a flowchart of an exemplary method 500 for buffer status reporting at a base station, consistent with some embodiments of the present disclosure. In the exemplary method 500, DL packets or MAC Status Indication messages may be passed through the Intelligent Status Reporting module 401 for calculating the buffer size that can be reported to MAC protocol layer and verifying the criteria for sending the buffer status reporting message (e.g., MAC Status Request message). The buffer status reporting message may be sent to MAC protocol layer 408. The exemplary method 500 may be implemented, for example, by the ISR module 401 of the base station.

As shown in step 502 of FIG. 5, the ISR module 401 may receive downlink packets from a PDCP entity of the base station. The ISR module 401 may calculate the PIR at step 506 based on the received downlink packets. For example, the PIR may be calculated based on the average number of packets received for a UE's logical channel over a time interval. In some embodiments, the PIR may be calculated as a running average of the current PIR and the past PIR using the parameter β received from the management application. An example mathematical expression of PIR is provided as follows:

NumberOfPacketPerLCHPerUE=NumberOfPacketsReceived FromPDCP/(current_time−previous_time)  Step 1:

PIR=β*(current_NumberOfPacketPerLCHPerUE− previous_NumberOfPacketPerLCHPerUE)+(1− β)*Previous_PacketIncomingRate  Step 2:

As shown above, calculating the PIR may include a first step of calculating the number of packet received Per LCH Per UE based on the number of packets received from the corresponding PDCP entity and the lapse of time for the arrival of the new packets. A second step of calculating the PIR may include updating the previous PIR by averaging of the number of packet received Per LCH Per UE with the previous PIR based on the Incoming Packet Size Constant β.

At step 508, the CBO may be calculated based on the packet size of the received downlink packets. For example, the CBO may be increased by the packet size of the received downlink packets.

To determine the ISRTI for sending the buffer status report, the ISR module 401 may account for the MAC Status Indication messages received from the MAC Protocol layer. The MAC Status Indication message may be an internal control message sent from the MAC protocol layer to the RLC protocol layer, indicating its available transmission capacity at the MAC protocol layer.

As shown in step 504 of FIG. 5, the ISR module 401 may receive MAC Status Indication messages from the MAC protocol layer of the base station. The ISR module 401 may calculate the Status Indication Time Interval (SITI) at step 510 based on, for example, the received MAC Status Indication messages. In some embodiments, the SITI may be calculated as a running average of the current SITI and the past SITI using the parameter α, i.e., the Status Indication Time Interval Constant, received from the management application. An example mathematical expression of SITI is provided as follows:

SITI=α*(current_time−previous_time)+(1×α)*Previous_SITI

As described above, the SITI may be updated by averaging the amount of time between the current and previous MAC Status Indication message with the previous SITI based on the Status Indication Time Interval Constant α.

At step 512, the ISR module 401 may calculate the ISRTI based on the updated SITI. An example mathematical expression of ISRTI is provided as follows:

ATO=$\epsilon$*(current_TransmissionOpportunity−previous_TransmissionOpportunity)+(1−$\epsilon$)*Previous_ATO  Step 1:

ISRTI=(SITI)*CBO/ATO  Step 2:

As shown above, calculating the ISRTI may include a first step of calculating the Average Transmission Opportunity (ATO). The ATO may represent the running average of transmission opportunity of a UE's logical channel, provided to the RLC protocol layer by the MAC Status Indication message. The transmission opportunity may indicate the size of packets, for example, in units of bytes, that can be transmitted by the RLC entity. The ISRTI may be calculated based on the values of SITI, CBO and ATO.

At step 514, the ISR module 401 may calculate the Expected Buffer Occupancy (EBO) based on the calculated ISRTI. For example, the EBO may be calculated by multiplying the calculated ISRTI with the PIR. The EBO may represent the expected buffer occupancy during the intelligent status reporting time interval, although those data packets are not yet received at the RLC entity At step 516, the ISR module 401 may determine whether buffer occupancy (BO) can be sent to the MAC protocol layer in a buffer status report message. For example, the ISR module 401 may determine whether the amount of time ISRTI has lapsed since the last buffer status report message was sent. If the amount of time ISRTI has lapsed since the last buffer status report message was sent, the ISR module 401 may determine that BO can be sent to the MAC protocol layer in an internal control message. On the other hand, if the amount of time ISRTI has not lapsed since the last buffer status report message was sent, the ISR module 401 may determine that BO cannot be sent to the MAC protocol layer in an internal control message, and the RLC entity may wait additional time before sending the BO to the MAC layer.

If the ISR module 401 determines that the BO cannot be sent, the RLC entity will not send the buffer status reporting message to the MAC protocol layer, and the method for buffer status reporting may return to steps 502 and 504.

If the ISR module 401 determines that the BO can be sent, the RLC entity may send the BO in a MAC Status Request message to the MAC protocol layer at step 518. The BO indicated in the MAC Status Request message may be a summation of the current buffer occupancy and the expected buffer occupancy. After sending the BO, the method for buffer status reporting may return to steps 502 and 504.

Figure 6:
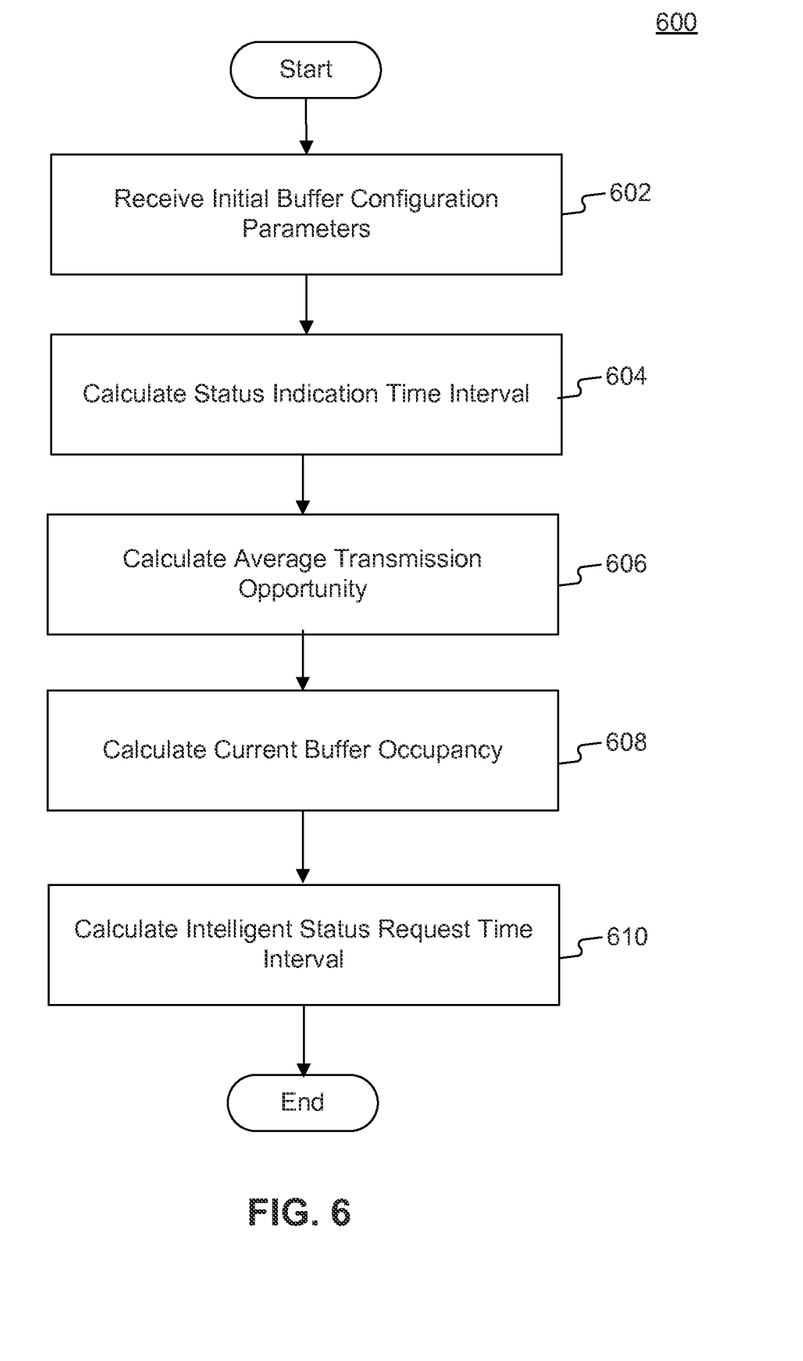
FIG. 6 is a flowchart of an exemplary method for determining intelligent status request time interval for buffer status reporting, consistent with some embodiments of the present disclosure.

FIG. 6 is a flowchart of an exemplary method 600 for determining intelligent status request time interval for buffer status reporting, consistent with some embodiments of the present disclosure. The exemplary method 600 may be implemented, for example, by the ISR module 401 of the base station.

As shown in step 602 of FIG. 6, the method for determining intelligent status request time interval for buffer status reporting may begin by receiving initial buffer configuration parameters from a management application. The initial buffer configuration parameters may include, for example, the Status Indication Time Interval Constant α and the Transmission Opportunity Constant $\epsilon$.

At step 604, the method may proceed by calculating the Status Indication Time Interval (SITI). The SITI may be calculated from the time interval between the current and last MAC Status Indication message received at the RLC protocol layer. In some embodiments, the SITI may be updated by averaging the time interval between the current and previous MAC Status Indication message with the previous SITI based on the Status Indication Time Interval Constant α.

At step 606, the method may proceed by calculating the Average Transmission Opportunity (ATO). The ATO may represent the transmission capacity at the MAC layer to transmit packets of a UE's logical channel. In some embodiments, the ATO may be updated by averaging the current transmission opportunity at the MAC protocol layer with the previous ATO based on the Transmission Opportunity Constant $\epsilon$. The current transmission opportunity at the MAC protocol layer may be indicated by an internal control message of the base station, e.g., the MAC Status Indication message.

At step 608, the method may proceed by calculating the current buffer occupancy (CBO). The CBO may be increased when new packets are received at the corresponding PDCP entity. For example, the CBO may be updated as follows when new packets are received:

CBO=CBO+IncomingPacketSize

At step 610, the method may proceed by calculating the Intelligent Status Request Time Interval (ISRTI). The ISRTI may represent the time interval for sending buffer status report to the MAC protocol layer in an internal control message, e.g., the MAC Status Request message. In some embodiments, the ISRTI may be determined to be proportional to the Current Buffer Occupancy and the SITI, and inversely proportional to the ATO. For example, the ISRTI may be expressed as:

ISRTI=(SITI)*CBO/ATO.

Figure 7:
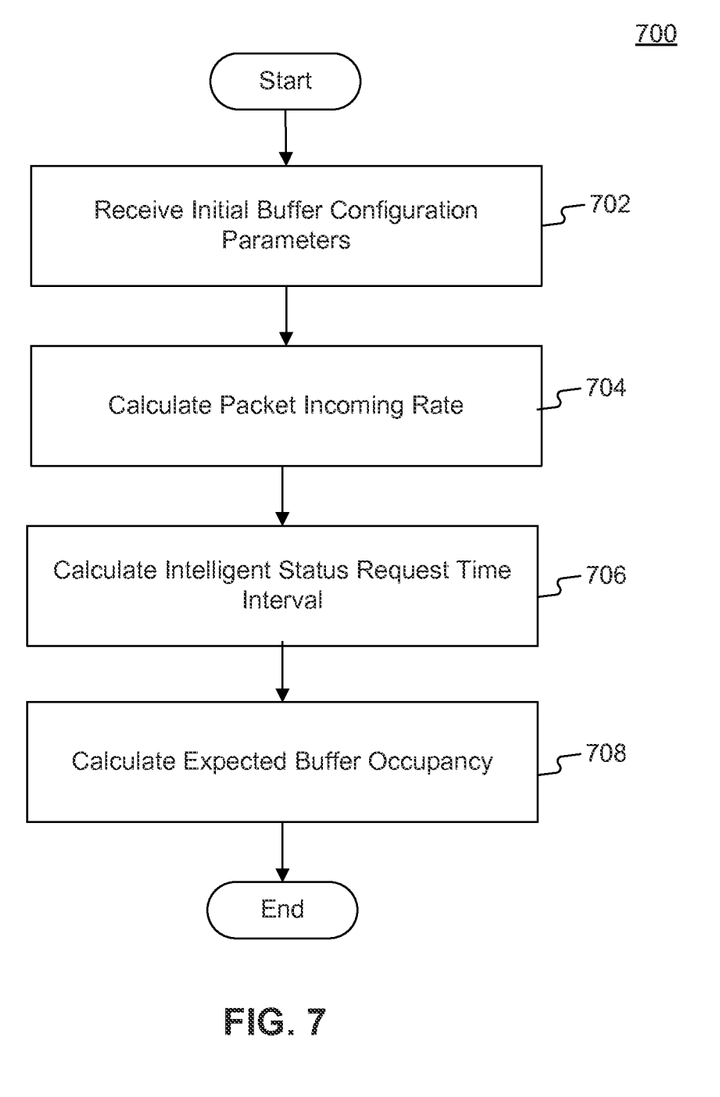
FIG. 7 is a flowchart of an exemplary method for determining expected buffer occupancy for buffer status reporting, consistent with some embodiments of the present disclosure.

FIG. 7 is a flowchart of an exemplary method 700 for determining expected buffer occupancy for buffer status reporting, consistent with some embodiments of the present disclosure. The exemplary method 700 may be implemented, for example, by the ISR module 401 of the base station.

As shown in step 702 of FIG. 7, the method for determining expected buffer occupancy for buffer status reporting may include receiving initial buffer configuration parameters from a management application. The initial buffer configuration parameters may include, for example, the Incoming Packet Size Constant β.

At step 704, the method may further include calculating the Packet Incoming Rate (PIR). The PIR may be determined by dividing the total number of packets received at the RLC entity corresponding to a UE's LCH by the time period within which the packets are received. In some embodiments, the PIR may be updated by averaging the current PIR with the previous PIR based on the Incoming Packet Size Constant β.

At step 706, the method may include calculating the Intelligent Status Request Time Interval (ISRTI). The ISRTI may be calculated by the method described in connection with FIG. 6. At step 708, the method may further include calculating the expected buffer occupancy (EBO). The EBO may be calculated based on the ISRTI and PIR. For example, the EBO may be calculated as follows: EBO=ISRTI*PIR. The EBO may increase as the ISRTI or the PIR increases, and decrease as the ISRTI or the PIR decreases. In some embodiments, the EBO may be combined with the CBO, and RLC entity may report a summation of the EBO and CBO to the MAC protocol layer in an internal control message, e.g., a MAC Status Request message.

The specification has described systems and methods for efficient buffer status reporting at a base station. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for efficient buffer status reporting at a base station, comprising:
   identifying a transmission opportunity associated with a first protocol layer of the base station, the transmission opportunity indicating a transmission capacity of the base station;
   determining, via one or more hardware processors, a time interval for sending a buffer status report from a second protocol layer of the base station to the first protocol layer based on at least the transmission opportunity;
   determining, via the one or more hardware processors, an expected buffer occupancy based on at least the time interval and a packet incoming rate associated with downlink packets; and
   sending the buffer status report from the second protocol layer to the first protocol layer based on at least the time interval.

2. The method of claim 1, wherein the buffer status report indicates a buffer size associated with the expected buffer occupancy of the downlink packets to be transmitted by the first protocol layer.

3. The method of claim 1, further comprising:
   determining a current buffer occupancy based on at least a packet size of incoming downlink packets, wherein the current buffer occupancy is increased by the packet size of the incoming downlink packets based on receiving the incoming downlink packets.

4. The method of claim 3, wherein determining the time interval further comprises:
   determining an average transmission opportunity associated with the first layer; and
   determining an average time interval between status indication messages sent from the first protocol layer to the second protocol layer, wherein the time interval is proportional to the current buffer occupancy and the average time interval between the status indication messages, and inversely proportional to the average transmission opportunity.

5. The method of claim 4, further comprising:
   receiving one or more parameters from an application of the base station, wherein the one or more parameters are used by the base station to determine at least one of the average transmission opportunity, the average time interval between the status indication messages, or the packet incoming rate.

6. The method of claim 1, wherein the packet incoming rate is determined by calculating an average number of packets received on a logical channel of a user equipment over a certain time period.

7. The method of claim 1, wherein the first protocol layer is a medium access control (MAC) layer and the second protocol layer is a radio link control (RLC) layer.

8. A system for efficient buffer status reporting at a base station, the system comprising:
   one or more hardware processors; and
   a memory storing instructions that, when executed by the one or more hardware processors, cause the one or more hardware processors to perform operations including:
   identifying a transmission opportunity associated with a first protocol layer of the base station, the transmission opportunity indicating a transmission capacity of the base station;
   determining a time interval for sending a buffer status report from a second protocol layer of the base station to the first protocol layer based on at least the transmission opportunity;
   determining an expected buffer occupancy based on at least the time interval and a packet incoming rate associated with downlink packets; and
   sending the buffer status report from the second protocol layer to the first protocol layer based on at least the time interval.

9. The system of claim 8, wherein the buffer status report indicates a buffer size associated with the expected buffer occupancy of the downlink packets to be transmitted by the first protocol layer.

10. The system of claim 9, wherein the memory stores instructions that, when executed by the one or more hardware processors, cause the one or more hardware processors to further perform operations including:
    determining a current buffer occupancy based on at least a packet size of incoming downlink packets, wherein the current buffer occupancy is increased by the packet size of the incoming downlink packets based on receiving the incoming downlink packets.

11. The system of claim 10, wherein determining the time interval further comprises:
    determining an average transmission opportunity associated with the first layer; and
    determining an average time interval between status indication messages sent from the first protocol layer to the second protocol layer, wherein the time interval is proportional to the current buffer occupancy and the average time interval between the status indication messages, and inversely proportional to the average transmission opportunity.

12. The system of claim 11, wherein the memory stores instructions that, when executed by the one or more hardware processors, cause the one or more hardware processors to further perform operations including:
receiving one or more parameters from an application of the base station, wherein the one or more parameters are used by the base station to determine at least one of the average transmission opportunity, the average time interval between the status indication messages, or the packet incoming rate.

13. The system of claim 8, wherein the packet incoming rate is determined by calculating an average number of packets received on a logical channel of a user equipment over a certain time period.

14. The system of claim 8, wherein the first protocol layer is a medium access control (MAC) layer and the second protocol layer is a radio link control (RLC) layer.

15. A non-transitory computer-readable medium storing instructions for efficient buffer status reporting at a base station that, when executed by a processor, cause the processor to perform operations including:
identifying a transmission opportunity associated with a first protocol layer of the base station, the transmission opportunity indicating a transmission capacity of the base station;
determining a time interval for sending a buffer status report from a second protocol layer of the base station to the first protocol layer based on at least the transmission opportunity;
determining an expected buffer occupancy based on at least the time interval and a packet incoming rate associated with downlink packets; and
sending the buffer status report from the second protocol layer to the first protocol layer based on at least the time interval.

16. The non-transitory computer-readable medium of claim 15, wherein the buffer status report indicates a buffer size associated with the expected buffer occupancy of the downlink packets to be transmitted by the first protocol layer r.

17. The non-transitory computer-readable medium of claim 15, wherein the non-transitory computer-readable medium stores instructions that, when executed by the processor, cause the processor to further perform operations including:
determining a current buffer occupancy based on at least a packet size of incoming downlink packets, wherein the current buffer occupancy is increased by the packet size of the incoming downlink packets based on receiving the incoming downlink packets.

18. The non-transitory computer-readable medium of claim 17, wherein determining the time interval further comprises:
determining an average transmission opportunity associated with the first layer; and
determining an average time interval between status indication messages sent from the first protocol layer to the second protocol layer, wherein the time interval is proportional to the current buffer occupancy and the average time interval between the status indication messages, and inversely proportional to the average transmission opportunity.

19. The non-transitory computer-readable medium of claim 18, wherein the non-transitory computer-readable medium stores instructions that, when executed by the processor, cause the processor to further perform operations including:
receiving one or more parameters from an application of the base station, wherein the one or more parameters are used by the base station to determine at least one of the average transmission opportunity, the average time interval between the status indication messages, or the packet incoming rate.

20. The non-transitory computer-readable medium of claim 15, wherein the packet incoming rate is determined by calculating an average number of packets received on a logical channel of a user equipment over a certain time period.

21. The non-transitory computer-readable medium of claim 15, wherein the first protocol layer is a medium access control (MAC) layer and the second protocol layer is a radio link control (RLC) layer.

* * * * *